US008850149B2

United States Patent
Mikami

(10) Patent No.: US 8,850,149 B2
(45) Date of Patent: Sep. 30, 2014

(54) INFORMATION PROCESSING APPARATUS, CONTROL METHOD OF THE INFORMATION PROCESSING APPARATUS AND PROGRAM

(75) Inventor: Fumio Mikami, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 13/171,941

(22) Filed: Jun. 29, 2011

(65) Prior Publication Data

US 2012/0011305 A1 Jan. 12, 2012

(30) Foreign Application Priority Data

Jul. 7, 2010 (JP) ................................. 2010-154563

(51) Int. Cl.
*G06F 12/00* (2006.01)
*G06F 21/60* (2013.01)
*G06F 21/62* (2013.01)

(52) U.S. Cl.
CPC ...... *G06F 21/608* (2013.01); *G06F 2221/2143* (2013.01); *G06F 21/6209* (2013.01)
USPC .................. 711/163; 711/E12.091

(58) Field of Classification Search
CPC . G06F 12/00; G06F 2221/2107; G06F 12/14; G06F 12/1408
See application file for complete search history.

(56) References Cited

U.S. PATENT DOCUMENTS

2009/0316899 A1* 12/2009 Kim et al. ..................... 380/255
2010/0306288 A1* 12/2010 Stein et al. .................... 707/959

FOREIGN PATENT DOCUMENTS

JP 2004-005586 A 1/2004

* cited by examiner

*Primary Examiner* — Reginald Bragdon
*Assistant Examiner* — Thanh D Vo
(74) *Attorney, Agent, or Firm* — Canon USA, Inc. IP Division

(57) ABSTRACT

An apparatus includes a first storage unit, a second storage unit, a setting unit configured to set a level of data deletion used for executing a job, an identification unit configured to identify a storage unit to be used for the job, and a control unit configured to, if the set level is a predetermined level and the identified storage unit is the first storage unit, store data of the job into the first storage unit and overwrite the stored data when the job is executed, and configured to, if the set level is the predetermined level and the identified storage unit is the second storage unit, encrypt data of the job and store the encrypted data into the second storage unit when the job is executed.

9 Claims, 4 Drawing Sheets

INFORMATION PROCESSING APPARATUS, CONTROL METHOD OF THE INFORMATION PROCESSING APPARATUS AND PROGRAM

BACKGROUND OF THE INVENTION

1. Field of the Invention

The present invention relates to an information processing apparatus, a control method of the information processing apparatus, and a program.

2. Description of the Related Art

If a conventional information processing apparatus sets its security level regarding data leakage high, data in a nonvolatile storage apparatus, for example, a hard disk drive (HDD) may be completely deleted after using the data. Japanese Patent Application Laid-Open No. 2004-005586 discusses a technique for completely deleting data in an HDD after using the data by overwriting the data in the HDD with other data.

However, if a method similar to the method for the HDD (method of overwriting a logical block addressing (LBA) to be deleted with data) is adopted as a data deletion method for a semiconductor storage apparatus, for example, a solid state drive (SSD), data inside the SSD cannot be completely deleted. The LBA is a method of specifying a sector with a serial number by assigning the serial number to all sectors in a hard disk.

However, if the same LBA is overwritten with other data by adopting the same method as that of the HDD for data deletion processing from the SSD, another physical address is assigned and written to the LBA due to a wear leveling operation, so that data will remain somewhere in the SSD.

The wear leveling operation is one method of increasing the life of a flash memory by writing in a distributed manner. More specifically, a semiconductor storage apparatus that performs wear leveling performs writing by rearranging blocks so that blocks that are less frequently written into are used if possible.

Thus, if the same data deletion method as that for the HDD is applied to such a semiconductor storage apparatus to overwrite the apparently the same LBA with other data, another physical address is actually specified due to block rearrangement control by ware leveling. Therefore, information may remain in a block before the rearrangement in the SSD.

Thus, if the security level (safety level) for data deletion is set high to delete data when job execution ends, data to be deleted may remain somewhere in a chip inside the SSD.

Therefore, there is an issue that even if the safety level set by the user is set high, data to be deleted actually remains in the SSD and requirements of data confidentiality cannot be met.

SUMMARY OF THE INVENTION

According to an aspect of the present invention, an apparatus includes a first storage unit, a second storage unit, a setting unit configured to set a level of data deletion used for executing a predetermined job, an identification unit configured to identify a storage unit to be used for the job, and a control unit configured to, if the set level is a predetermined level and the identified is the first storage unit, store data of the job into the first storage unit and overwrite the stored data when the job is executed, and configured to, if the set level is the predetermined level and the identified storage unit is the second storage unit, encrypt data of the job and store the encrypted data into the second storage unit when the job is executed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
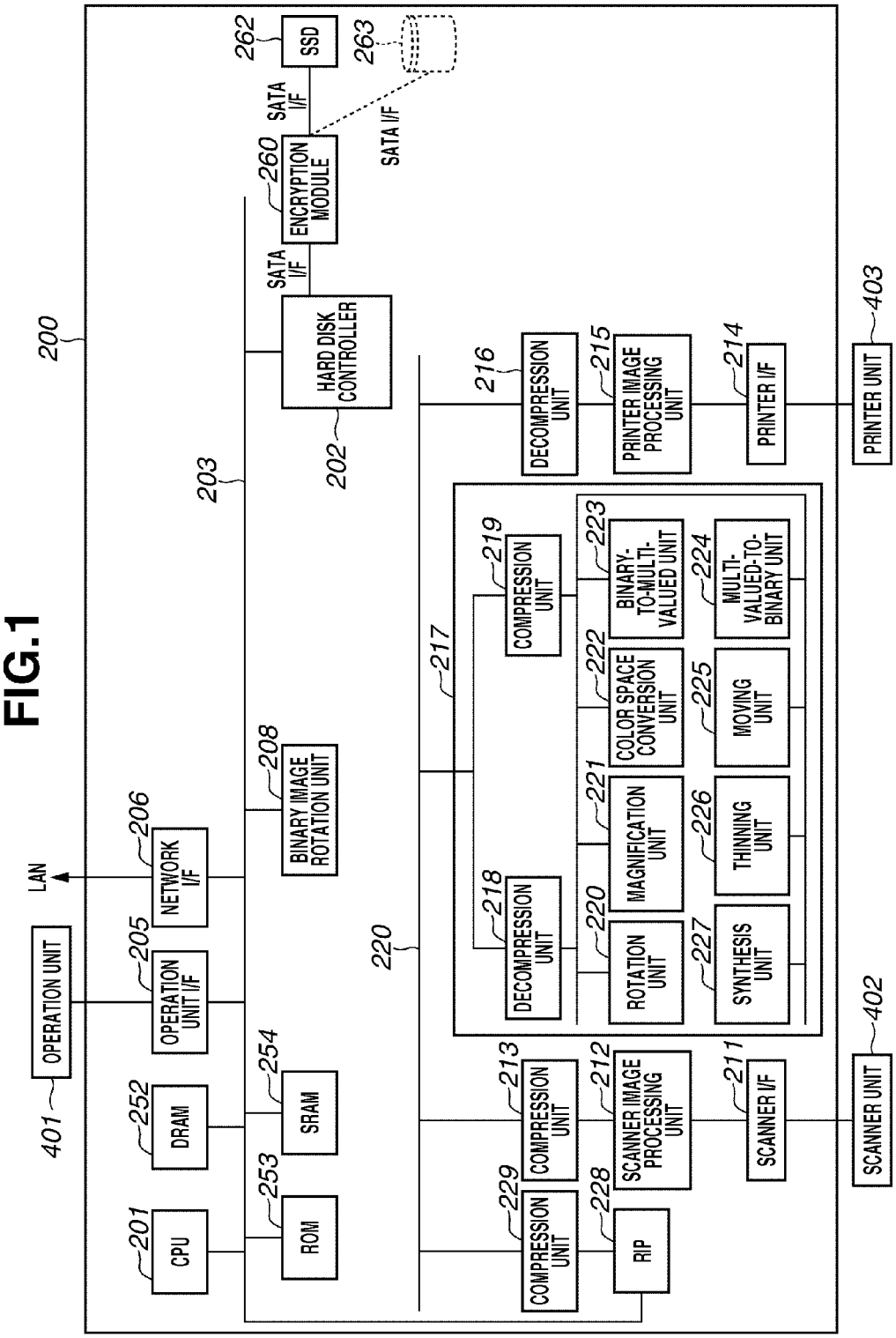
FIG. 1 is a block diagram illustrating a configuration of an information processing apparatus.

FIG. 1 is a block diagram illustrating a configuration of an information processing apparatus according to a first exemplary embodiment. The present exemplary embodiment illustrates an example of the information processing apparatus including an HDD that stores information by driving a disk to rotate as a storage device and an SSD as a semiconductor storage device. Also in the present exemplary embodiment, a multifunction peripheral (MFP) is shown as an example of the information processing apparatus, but the present exemplary embodiment is not limited to this. In the present example, one hard disk controller described below controls access to one of the HDD and the SSD. The present exemplary embodiment is an example in which a first storage unit is configured of a solid state drive and a second storage unit is configured by a hard disk drive.

In FIG. 1, a system controller 200 has a control function of the MFP. The system controller 200 is electrically connected to an operation unit 401, a scanner unit 402, and a printer unit 403. On the other hand, the system controller 200 can perform communication of image data and device information with personal computers (PCs) and external devices via a local area network (LAN).

In the system controller 200, a central processing unit (CPU) 201 integrally controls access of devices connected to a system bus based on a control program stored in a read-only memory (ROM) 253. A dynamic random access memory (DRAM) 252 is a system work memory for the CPU 201 to operate and is also a memory to temporarily store an encryption key of an encryption module, and stored content thereof is deleted by power-off. A static random access memory (SRAM) 254 is backed up by a battery so that stored content is maintained also after power-off. The ROM 253 stores a boot program of the apparatus.

A hard disk controller 202 is connected to an SSD 262 or a hard disk 263 by a serial advanced technology attachment (SATA) interface via an encryption module 260 connected by the SATA interface.

One of the SSD and the hard disk is connected in the present exemplary embodiment and it is assumed that the SSD is first connected.

An operation unit interface (I/F) 205 connects a system bus 203 and the operation unit 401. The operation unit I/F 205 receives image data to be displayed in the operation unit 401 from the system bus 203 and outputs the image data to the operation unit 401. The operation unit I/F 205 also outputs to the system bus 203 information input from the operation unit 401.

A network I/F 206 is connected to the LAN and the system bus 203. An image bus 220 is a transmission path to exchange image data and is configured by a peripheral component interconnect (PCI) bus.

The operation unit 401 can set a level of data deletion to be executed in the SSD or the HDD which are used when a predetermined job is executed in two levels of high and low. The operation unit 401 may control the deletion level to be determined according to the type of a job to be executed by further increasing set deletion levels or by managing a deletion level table in which deletion levels are assigned to the types of jobs to be executed.

A scanner image processing unit 212 corrects, processes, and edits image data received from the scanner unit 402 via a scanner I/F 211. The scanner image processing unit 212 determines whether received image data is a color document or a monochrome document, a character document or a photo document, and the like. Then, the scanner image processing unit 212 attaches determination results thereof to the image data. Such attached information is referred to as image region data. A compression unit 213 receives image data and divides the image data into block units of 32 pixels*32 pixels.

<Description of the Copying Operation>

The image data read by the scanner unit 402 is transmitted to the scanner image processing unit 212 via the scanner I/F 211.

The compression unit 213 divides image data output from the scanner image processing unit 212 into block units of 32 pixels*32 pixels to generate and compress tile data. The compressed image data is transmitted to the DRAM 252 to be temporarily stored therein. The image data is transmitted to an image conversion unit 217 if necessary and, after image processing being performed thereon, transmitted back to the DRAM 252 again for storage.

Then, the image data is transferred from the DRAM 252 to the hard disk controller 202. The encryption module 260 is connected to the hard disk controller 202 via the SATA interface and data encrypted if necessary is written into the SSD 262 via the SATA interface.

Next, data read from the SSD is decrypted by the encryption module 260 and transmitted to the system bus 203.

Then, the image data is transmitted from the system bus 203 to a decompression unit 216. The decompression unit 216 decompresses the image data. Further, the decompression unit 216 rasterizes the image data of a plurality of the tile data pieces after decompression. The image data after rasterization is transmitted to a printer image processing unit 215. The image data processed by the printer image processing unit 215 is transmitted to the printer unit 403 via a printer I/F 214.

The image data is caused to pass through the SSD 262 or the hard disk 263, so that a work area for performing page replacement processing or the like is secured. In the present exemplary embodiment, a medium in which image data is stored is configured to be able to connect to one of the SSD 262 or the hard disk (HDD) 263.

<Description of the Control Flow>

Figure 2:
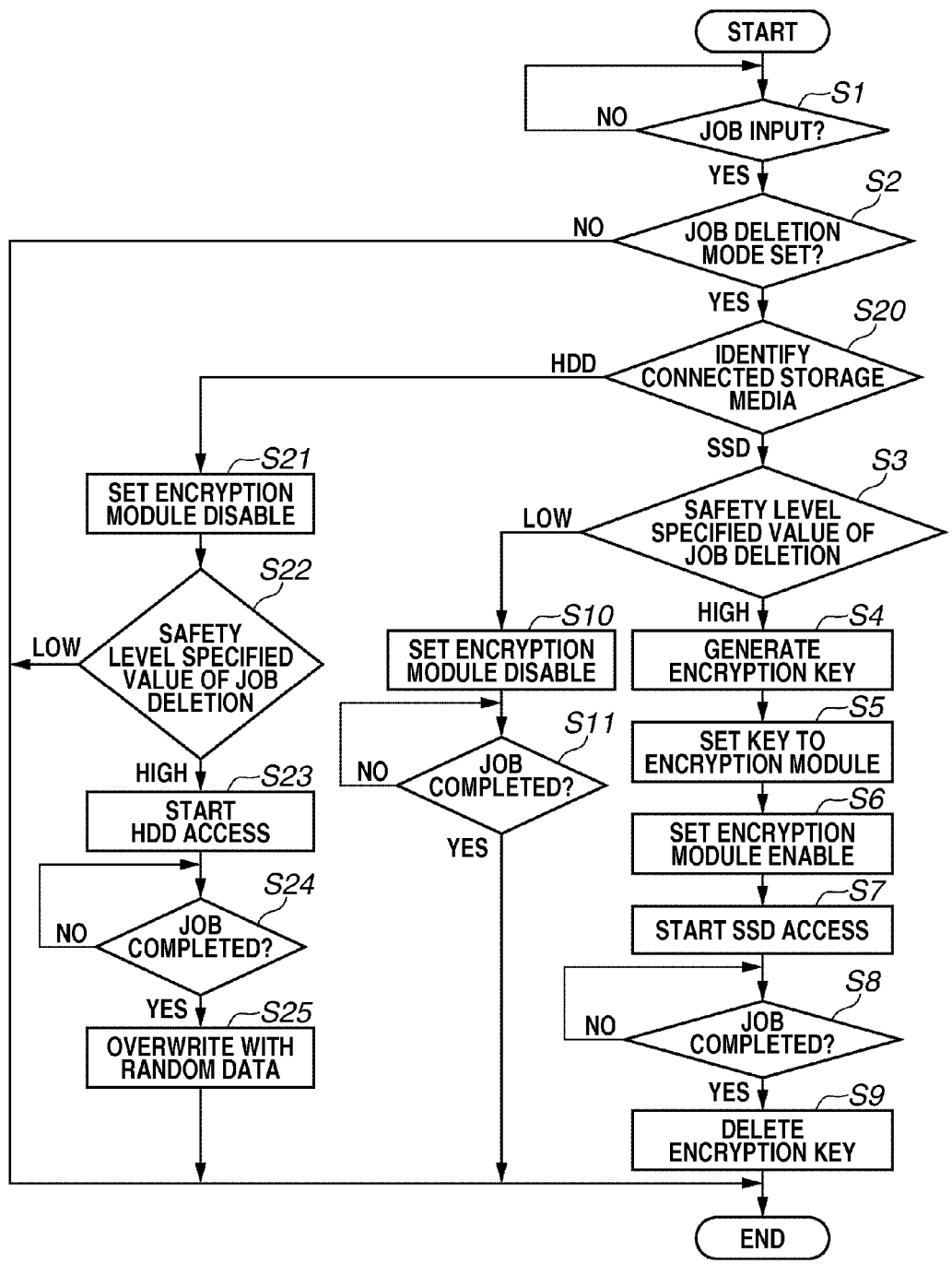
FIG. 2 is a flow chart illustrating a data processing procedure for the information processing apparatus.

FIG. 2 is a flow chart illustrating a data processing procedure for the information processing apparatus according to the present exemplary embodiment. In the present example, information stored in the HDD 263 or the SSD 262 is deleted by the CPU 201. Each step in the flow chart is realized by the CPU 201 loading a control program stored in the ROM 253 into the DRAM 252 and executing the program. Processing will be described in detail below in which the storage device to be used for a job to be executed is identified and data deletion adapted to the HDD or SSD is executed each time the job is completed according to the set deletion level.

In step S1, if the CPU 201 confirms a job is input (YES in step S1), then, in step S2, the CPU 201 determines whether a job deletion mode is set by a user in advance from the operation unit 401. If the CPU 201 determines that the job deletion mode is set (YES in step S2), the processing proceeds to step S20. If the CPU 201 determines that no job deletion mode is set (NO in step S2), the CPU 201 terminates the present processing.

In step S20, the CPU 201 identifies which storage device of the SSD 262 and the HDD 263 is connected to the system. If the CPU 201 identifies that the SSD 262 is connected (SSD in step S20), the processing proceeds to step S3. If the CPU 201 identifies that the HDD 263 is connected (HDD in step S20), the processing proceeds to step S21.

In step S3, the CPU 201 examines a specified value of the safety level of job deletion preset by the user from the operation unit 401 and stored in the SRAM 254 or the like. Instead of the SRAM 254, a nonvolatile RAM (NVRAM) (not illustrated) may be used.

If the CPU 201 determines that the specified value of the safety level of job deletion is high (HIGH in step S3), the processing proceeds to step S4. Then, in step S4, the CPU 201 generates an encryption key to be set to the encryption module 260 illustrated in FIG. 1.

Since the CPU 201 generates the encryption key in the DRAM 252, the encryption key is maintained only while the power is maintained.

Next, in step S5, the CPU 201 sets the generated key to the encryption module 260 and, in step S6, the CPU 201 enables the encryption module 260 to perform an encryption operation.

Next, in step S7, the CPU 201 executes a job and encrypts image data to be processed by the encryption module 260 via the hard disk controller 202, and then the data is read from or written into the SSD 262. Here, the job is function processing of the MFP and includes a job specified from a user interface (UI) screen (not illustrated) and a received print job.

Next, in step S8, the CPU 201 determines whether the specified job has been completed. If the CPU 201 determines that the job has been completed (YES in step S8), in step S9, the CPU 201 deletes the encryption key stored in the DRAM 252 and at the same time, deletes the encryption key of the encryption module 260. Then, the present processing is terminated.

Accordingly, after the job is completed, image data remaining in the SSD 262 cannot be decrypted and thus, no history of the job remains in the SSD 262 and confidentiality can be maintained.

On the other hand, in step S3, if the CPU 201 determines that the specified value of the safety level of job deletion is low (LOW in step S3), the processing proceeds to step S10. In step S10, the CPU 201 disables the encryption module 260 and, in step S11, if the CPU 201 determines that the job has been completed, the CPU 201 terminates the present processing.

On the other hand, in step S20, if the connected storage device is determined as the HDD (HDD in step S20), the processing proceeds to step S21. In step S21, the CPU 201 disables the encryption module 260.

Next, in step S22, the CPU 201 determines whether the specified value of the safety level of job deletion preset by the user from the operation unit 401 is high or low. The CPU 201 determines whether the specified value of the safety level of job deletion is high or low by referring to the set value corresponding to the safety level of job deletion stored in the SRAM 254 after being set by the user using the operation unit 401.

If the CPU 201 determines that the specified value of the safety level of job deletion is a high level (HIGH in step S22), the processing proceeds to step S23.

In step S23, the CPU 201 accesses the HDD 263 in a plain text during job execution. In step S24, if the CPU 201 determines that the job is completed (YES in step S24), in step S25, the CPU 201 writes random data (specific data) into an area used by the HDD 263 for job execution once or a plurality of times, and then terminates the present processing.

On the other hand, in step S22, if the CPU 201 determines that the specified value of the safety level of job deletion is low (LOW in step S22), the CPU 201 terminates the present processing without performing deletion processing, and leaves the image data used by the HDD 263 accompanying job execution when the job is completed.

The encryption key generated by the CPU 201 in step S4 is randomly generated inside the controller for each job and cannot be known by analogy from outside.

In the present exemplary embodiment, the encrypted data remains in the SSD if the SSD is connected and cannot be deleted completely in view of the configuration of the SSD and thus, the encryption key is deleted for each job so that data cannot be restored from outside.

On the other hand, if the HDD is connected, there is no need for encryption because traces of data can be disturbed by writing random data a plurality of times to the same address.

If the configuration of the encryption module requires a predetermined time period for processing of encryption and decryption, a processing speed as the apparatus can be made unaffected by refraining from using encryption when the hard disk is connected.

Figure 3:
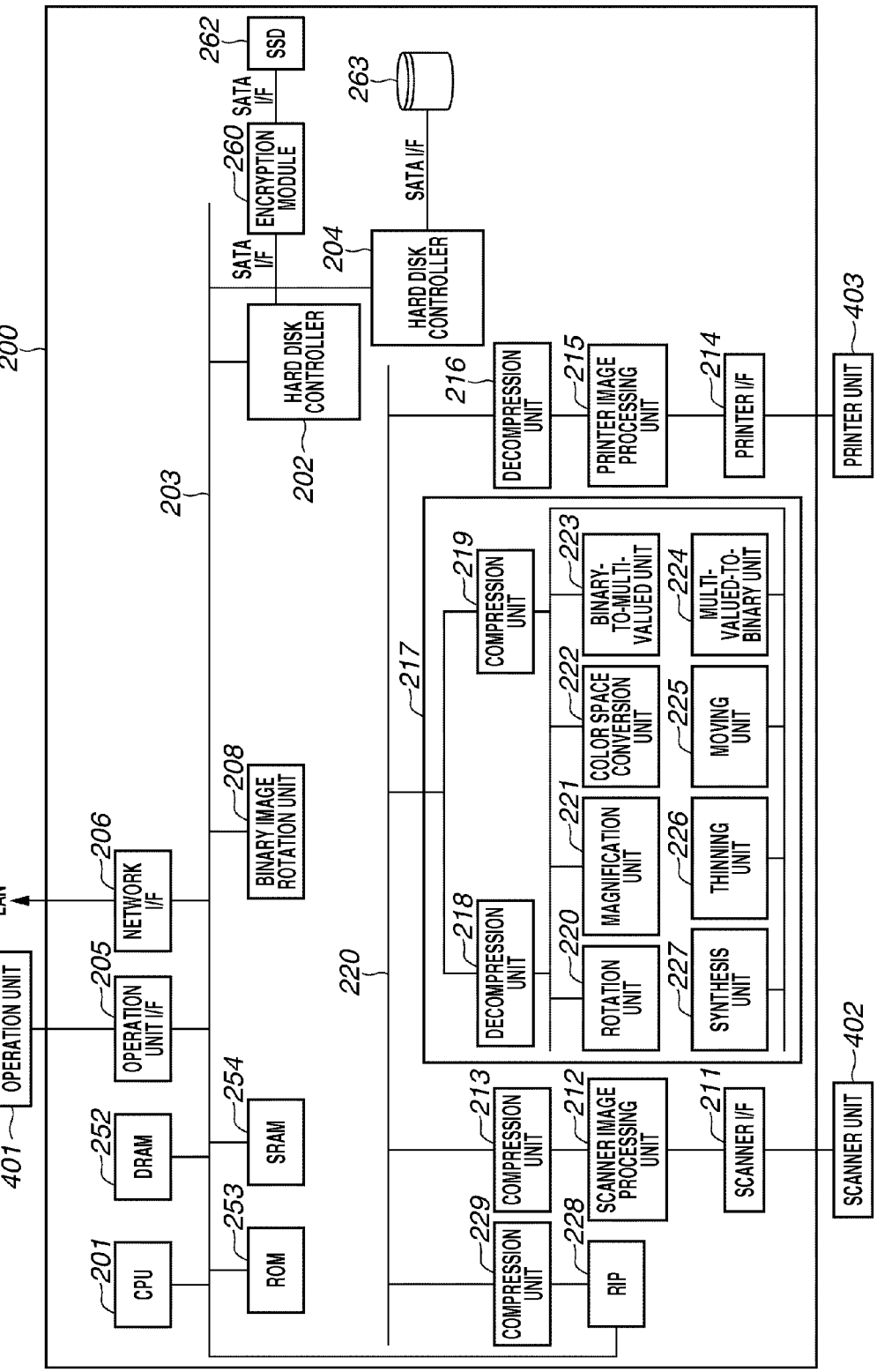
FIG. 3 is a block diagram illustrating the configuration of the information processing apparatus.

FIG. 3 is a block diagram illustrating a configuration of an information processing apparatus according to a second exemplary embodiment. The present exemplary embodiment illustrates an example of the information processing apparatus including an HDD that stores information by driving a disk to rotate as a storage device and an SSD as a semiconductor storage device. Also in the present exemplary embodiment, a multifunction peripheral (MFP) is shown as an example of the information processing apparatus, but the present exemplary embodiment is not limited to this. In the present example, two hard disk controllers described below independently control access to the HDD and the SSD.

In FIG. 3, a first hard disk controller 202 is connected to the system bus 203 and also connected to the SSD 262 via the encryption module 260. A second hard disk controller 204 is also connected to the system bus 203 and also connected to the HDD 263.

The SSD 262 can store small-capacity data of, for example, 80 GB and is mounted as a standard product shipment configuration. The HDD 263 has a large capacity of, for example, 1000 GB and is connected as an option. It is assumed that a small-capacity hard disk is used as a medium to store a system program and to temporarily store data, and a large-capacity hard disk is used to store user data.

While the SSD is comparatively high in cost and suitable as a small-capacity storage medium to ensure reliability, the HDD is practical as a large-capacity storage medium and the present exemplary embodiment has a form to mount both storage media.

In the present exemplary embodiment, an apparatus in which an SSD is mounted as standard equipment and a large-capacity HDD is optionally mounted is taken as an example. The CPU 201 loads a program from the SSD 262 when the system is activated. The SSD 262 is used as a place where the image data is temporarily stored during job execution.

Recent MFPs have been equipped with a function called a big box or so to save user data and a small capacity of the SSD 262, for example, 80 GB is insufficient to realize the function, so that a user area of the HDD 263 of a large capacity of, for example, 1000 GB is used.

If the job deletion mode is set in system settings from the operation unit 401, the SSD 262 is used for the job execution and is accessed with data encrypted/decrypted by the encryption module 260.

When a job is completed, data written into the SSD 262 can be invalidated by discarding the encryption key used for the job.

On the other hand, with respect to an instruction to write data into the big box, the data is written into the HDD 263. If the user issues an instruction to delete a file in the big box of the HDD 263, data in the HDD 263 is to be deleted and the CPU 201 writes random data into a deletion area a plurality of times.

Figure 4:
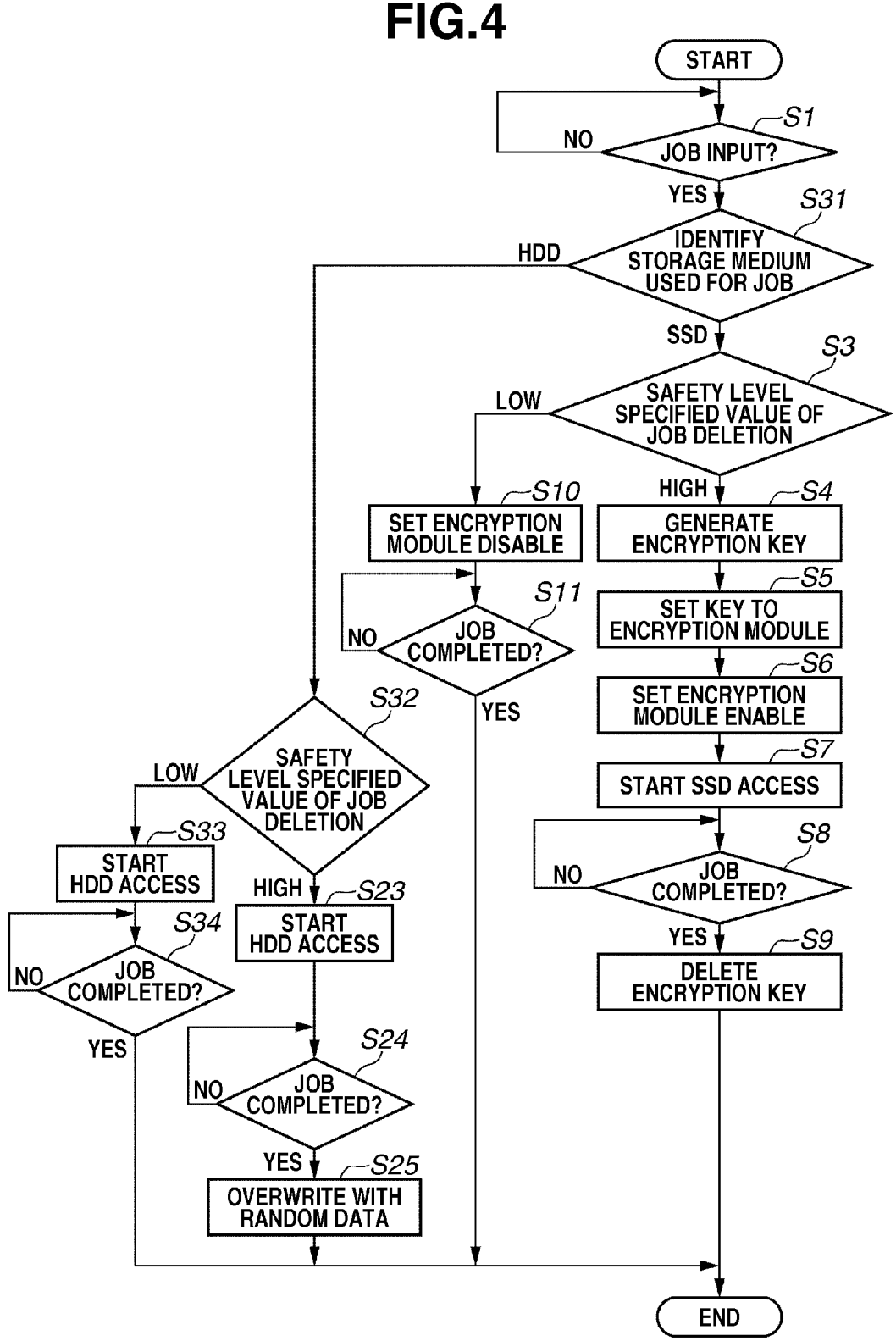
FIG. 4 is a flow chart illustrating the data processing procedure for the information processing apparatus.

FIG. 4 is a flow chart illustrating the data processing procedure for the information processing apparatus according to the present exemplary embodiment. In the present example, information stored in the HDD 263 or the SSD 262 is deleted by the CPU 201. Each step in the flowchart is realized by the CPU 201 loading a control program stored in the ROM 253 into the DRAM 252 and executing the program. In the present exemplary embodiment, the description focuses on steps that are different from those in the first exemplary embodiment illustrated in FIG. 2 and a description of the same steps will not be repeated.

In step S1, if the CPU 201 confirms a job is input, then the processing proceeds to step S31 to determine whether the storage device used for the job is the HDD or the SSD. If the job type is, for example, a print job and the job is such that the user uses a box area using login information, the CPU 201 determines to use the HDD. The CPU 201 may determine the storage device to use according to an amount of memory used for the job or according to user information or group information.

If the CPU 201 determines to use the HDD 263 (HDD in step S31), then in step S32, the CPU 201 examines the specified value of the safety level of job deletion preset by the user from the operation unit 401 and stored in the SRAM 254 or the like. Instead of the SRAM 254, a NVRAM (not illustrated) may be used.

If the CPU 201 determines that the specified value of the safety level of job deletion is high (HIGH in step S32), the CPU 201 advances the processing to step S23 to perform data processing like in the first exemplary embodiment. On the other hand, in step S32, if the CPU 201 determines that the specified value of the safety level of job deletion is low (LOW in step S32), the processing proceeds to step S33.

In step S33, the CPU 201 accesses the HDD 263 in a plain text during job execution. In step S34, if the CPU 201 determines that the job is completed (YES in step S34), the CPU 201 terminates the present processing without performing data deletion processing.

According to the present exemplary embodiment, if the security level is set high, data can be deleted by an appropriate method according to the type of storage device so that confidentiality of data stored in the storage device can be guaranteed.

More specifically, for example, the following effects can be gained. An effect equivalent to complete deletion can be achieved from the SSD from which data cannot be completely deleted. Moreover, according to a conventional example, while confidentiality is endangered if the storage device is removed before data is deleted after a job operation is completed. In contrast, the present invention can avoid the danger of leakage if the storage device is removed because encrypted data is recorded.

Further, a data deletion operation by overwriting is conventionally performed in a separate time from the job and thus, an amount of data flowing through the interface with the storage device increases, which may cause the processing speed of job to slow down.

However, according to the present invention, the apparatus includes a unit capable of performing encryption/decryption processing in real time, so that slowdown of the processing speed can be avoided. Further, only several tens of bits are present in the DRAM at the most as deletion of the encryption key, thus the deletion time of the encryption key is virtually invisible.

Moreover, application of encryption writing to the hard disk can make the conventional "batch deletion" mode unnecessary. Accordingly, the conventional issue that confidentiality is endangered until the batch deletion operation is performed can be avoided.

Aspects of the present invention can also be realized by a computer of a system or apparatus (or devices such as a CPU or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-154563 filed Jul. 7, 2010, which is hereby incorporated by reference herein in its entirety.

What is claimed is:

1. An apparatus capable of connecting a first storage unit and a second storage unit, the apparatus comprising:
an identification unit configured to identify a storage unit being connected to the apparatus;
a control unit configured to, if the identified storage unit is the first storage unit, store data of a job into the first storage unit and overwrite the stored data when the job is executed, and configured to, if the identified storage unit is the second storage unit, encrypt data of the job and store the encrypted data into the second storage unit when the job is executed; and
a setting unit configured to set a safety level used for the job,
wherein, in a case that the set level is a high level, if the identified storage unit is the first storage unit, the control unit stores data of the job into the first storage unit and overwrites the stored data when the job is executed, and, if the identified storage unit is the second storage unit, the control unit encrypts data of the job and stores the encrypted data into the second storage unit when the job is executed.

2. The apparatus according to claim 1,
wherein, in a case that the set level is a low level, if the identified storage unit is the first storage unit, the control unit stores data of the job into the first storage unit does not overwrite the stored data when the job is executed, and, if the identified storage unit is the second storage unit, the control unit does not encrypt data of the job and store the data into the second storage unit when the job is executed.

3. The apparatus according to claim 1 wherein, the first storage unit is a hard disk drive (HDD), and the second storage unit, is a solid-state drive (SDD).

4. A method for an apparatus capable of connecting a first storage unit and a second storage unit, the method comprising:
identifying a storage unit being connected to the apparatus;
storing data of a job, if the identified storage unit is the first storage unit, into the first storage unit and overwriting the stored data when the job is executed, and encrypting data of the job, if the identified storage unit is the second storage unit, and storing the encrypted data into the second storage unit when the job is executed; and
setting a safety level used for the job,
wherein, in a case that the set level is a high level, if the identified storage unit is the first storage unit, the storing stores data of the job into the first storage unit and overwriting the stored data when the job is executed, and, if the identified storage unit is the second storage unit, the encrypting encrypts data of the job and stores the encrypted data into the second storage unit when the job is executed.

5. The method according to claim 4,
wherein, in a case that the set level is a low level, if the identified storage unit is the first storage unit, the storing stores data of the job into the first storage unit and does not overwrite the stored data when the job is executed, and, if the identified storage unit is the second storage unit, the encrypting does not encrypt data of the job and store the data into the second storage unit when the job is executed.

6. The method according to claim 4, wherein the first storage unit is a hard disk drive (HDD), and the second storage unit is a solid-state drive (SSD).

7. A non-transitory computer readable medium storing a computer-executable program of instruction for causing a computer to perform a method for an apparatus capable of connecting a first storage unit and a second storage unit, the method comprising:
identifying a storage unit being connected to the apparatus;
storing data of a job, if the identified storage unit is the first storage unit, into the first storage unit and overwriting the stored data when the job is executed, and encrypting data of the job, if the identified storage unit is the second storage unit, and storing the encrypted data into the second storage unit when the job is executed; and
setting a safety level used for the job,
wherein, in a case that the set level is a high level, if the identified storage unit is the first storage unit, the storing stores data of the job into the first storage unit and overwriting the stored data when the job is executed, and, if the identified storage unit is the second storage unit, the encrypting encrypts data of the job and stores the encrypted data into the second storage unit when the job is executed.

8. The non-transitory computer readable medium according to claim a 7,
wherein, in a case that the set level is a low level, if the identified storage unit is the first storage unit, the storing stores data of the job into the first storage unit and does not overwrite the stored data when the job is executed, and, if the identified storage unit is the second storage unit, the encrypting does not encrypt data of the job and store the data into the second storage unit when the job is executed.

9. The non-transitory computer readable medium according to claim 7, wherein the first storage unit is a hard disk drive (HDD), and the second storage unit is a solid-state drive (SSD).

* * * * *